Patented Nov. 4, 1941

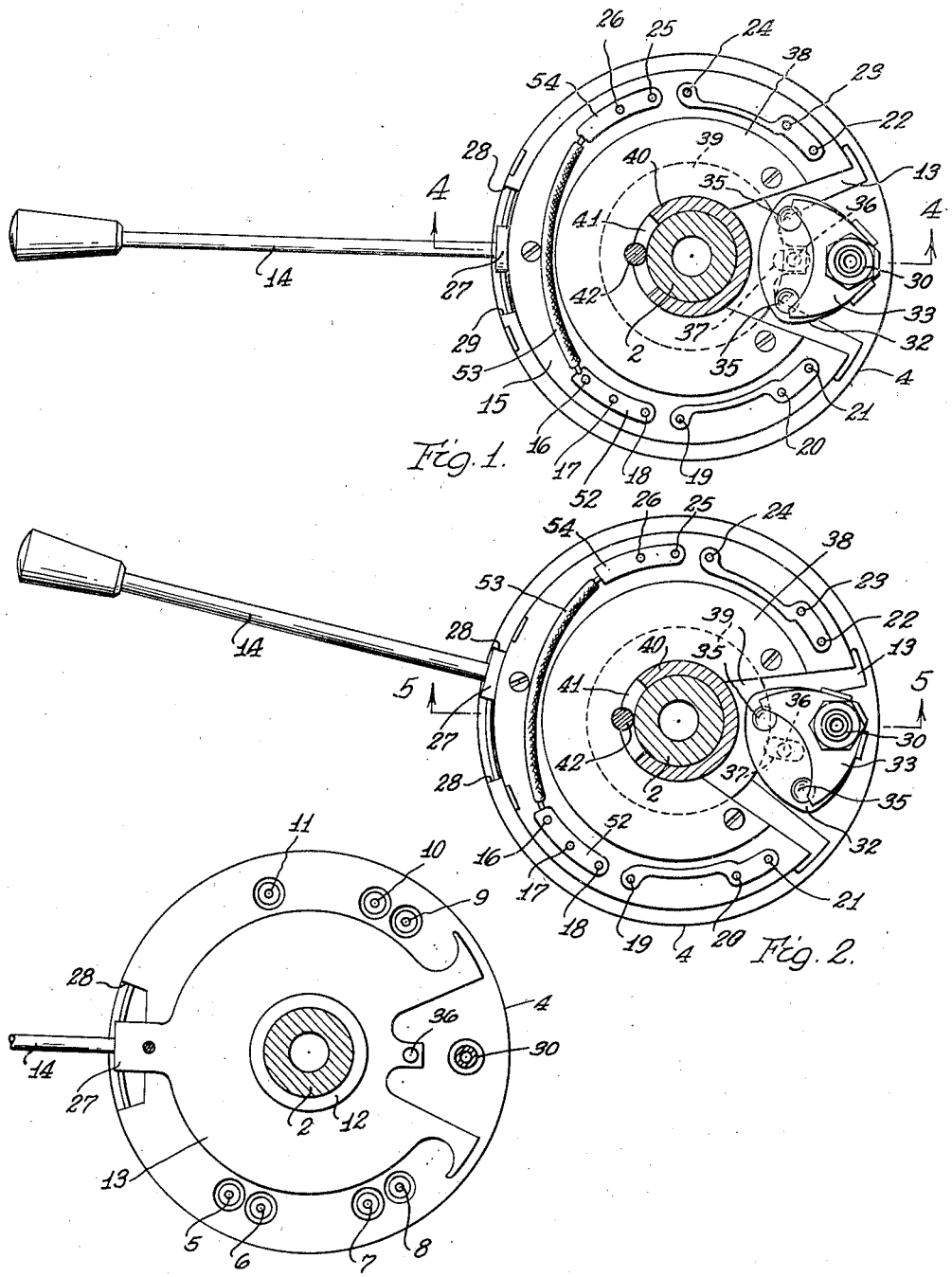

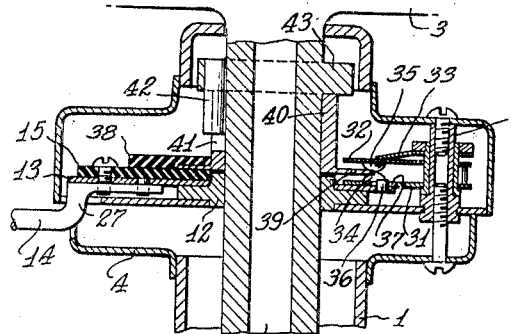

2,261,817

UNITED STATES PATENT OFFICE 2,261,817

DIRECTION INDICATOR SWITCH

August E. Wilshusen, Ypsilanti, Mich.

Application November 1, 1940, Serial No. 363,881

8 Claims. (Cl. 200—59)

This invention relates to electric circuits and means for energizing and de-energizing the same, and is particularly concerned with electrical circuits such as are used in conjunction with direction indicating signals on automobiles.

The primary object is to provide a direction indicator system for vehicles embodying signal lamps at the rear of the vehicle, signal lamps at the front sides of the vehicle, and tell-tale lamps mounted on the dash for indicating to the operator of the vehicle whether or not the rear and front signal lamps are operative. More specifically, the invention has for its object to utilize either the tail lights or the so-called stop lights, a pair of each of which are standard equipment on automobiles, as the rear direction indicators. In this respect, the system, under normal conditions, provides for energization of both stop lights by means of the usual brake pedal switch. When a signal is to be given while the brakes are applied, or if the brakes are applied while a signal is being given, the system disconnects the right or left stop light from its normal circuit, according to the direction of the contemplated turn, and illuminates the selected stop light through a blinker system. By blinking the stop light a contrast is provided between the two stop lights. The same function takes place with regard to the tail lights. That is, if the tail lights are illuminated the present switch selects one of them and causes it to blink while the remaining light glows constantly.

Another object is to provide a system of the above mentioned character having a control switch adapted to be mounted on the steering column of an automobile, having a manual control for providing a right or left turn indication according to the will of the operator, and embodying means for automatically restoring the switch mechanism to a normal or neutral position after the indicated turn has been made. The means for restoring the switch is designed for operation as a result of movement of a steering member which is moved by the steering wheel of the automobile, and is so constructed that the switch remains operative during any amount of movement of the steering member in the direction of turn, and returns to its normal position after a short movement of the steering member in a vehicle straightening direction.

Other objects and advantages will become more fully apparent as reference is had to the accompanying drawings, wherein my invention is illustrated, and in which Fig. 1 is a plan of the switch mechanism with its top cover removed, Fig. 2 is a view similar to Fig. 1, showing the mechanism in a different position, Fig. 3 is a view similar to Fig. 1 with part of the mechanism removed to expose contacts located therebeneath, Fig. 4 is a section taken on the line 4—4 of Fig. 1, Fig. 5 is a section taken on the line 5—5 of Fig. 2, and Figs. 6, 7 and 8 are circuit diagrams, each showing a different condition in the circuit.

The tubular element shown at 1 in Figs. 4 and 5 is intended to represent the steering column of an automobile. Extending through this column is a member 2, representing the member which extends through the steering column to connect the steering wheel with the steering mechanism in the front of the automobile. The steering wheel is schematically shown at 3.

Mounted upon the upper end of the column 1 is a hollow bracket 4 having a multiplicity of contacts 5, 6, 7, 8, 9, 10 and 11, all equally spaced from the axis of the column 1. The bracket carries a central bearing member 12 upon which a disc 13 is rotatably journalled. A handle 14 is connected to the disc 13 and extends radially therefrom. Secured upon the disc 13, and movable therewith, is an insulating element 15 having a multiplicity of contacts designated 16 to 26 respectively. The contacts 16 to 26 are spaced radially a distance equal to the contacts 5 to 11, and certain of the contacts 16 to 26 are adapted to engage certain of the contacts 5 to 11. The manner in which the two sets of contacts coact is described hereinafter.

The disc 13 is adapted to be moved to three positions. One position is the neutral position shown in Fig. 1, another is the position shown in Fig. 2 which is the right turn position, and the third is the left hand position. The latter position is not shown. When in the right hand position the handle bracket 27 contacts a limiting shoulder 28, and when in a left hand position the handle bracket 27 contacts a shoulder 29.

Rotatably mounted upon a stud 30 are two plates 31 and 32, having a comparatively strong spring 33 normally pressing them toward each other. The plate 31 has two upwardly extending, dome-like projections 34 and the plate 32 has a similar pair of projections 35, and the spring 33 normally acts to press the projections 34 into contact with the projections 35. The disc 13 carries an upstanding pin 36 which extends into a slot 37 in the plate 31 so that when the disc 13 is moved to the position shown in Fig. 2, the plates 31 and 32 are caused to swing about the axis of the stud 30.

Loosely mounted on the insulating member 15, by a second insulating member 38 is a comparatively thin metal disc 39 of a diameter such that it extends between the two plates 31 and 32, slightly spaced from the projections 34 and 35. The disc 39 has an axial extension 40 with a notch 41 therein. A pin 42, carried by a collar 43 on the element 2, extends into the notch 41.

When the disc 13 is moved from the position shown in Fig. 1 to that shown in Fig. 2, the pin 36 causes the plates 31 and 32 to rock from the position shown in Fig. 1 to that shown in Fig. 2. This causes a pair of the projections 34 and 35 to move into engagement with opposite sides of the metal disc 39, as may be seen by comparison of Figs. 2 and 5. If the element 2 is rotated clockwise, as viewed in Fig. 2, the pin 42 causes the disc 39 to rotate clockwise, and the latter, in slipping between the projections 34 and 35 tends to move the plates 31 and 32 in the same direction they were moved by the disc 13. This, therefore, does not disturb the setting of the disc 13 or plates 31 and 32. However, when the element 2 is rotated counterclockwise, with the mechanism positioned as shown in Fig. 2, the disc 39 urges the plates back toward the position shown in Fig. 1, or, in other words, toward its neutral position. As the plates 31 and 32 approach their neutral position the projections 34 and 35 snap off the edge of the disc 39, and the disc 13 will remain in its neutral position until such time as sufficient pressure is exerted against the plates 31 and 32 to expand the same through contact of the projections 34 and 35 with the disc 39. By providing two sets of projections 34 and 35, as shown in Figs. 1 and 2, the disc 13 may be restored to its neutral position from either its right or left hand positions.

Referring to Figs. 6, 7 and 8, it will be seen that the contact 5 is connected by a wire 45 and a switch 46 to a battery 47, the switch 46 representing the usual stop-light switch which is ordinarily actuated by the brake pedal of an automobile when the stop lights are used in the circuit. When the tail lights are used, the switch 46 represents the usual manual switch which controls the automobile lights. The contact 6 is connected by a wire 48 to the right hand tail light 49, and the contact 11 is connected by a wire 50 to the left hand tail light 51. The contacts 16, 17 and 18 are connected together as indicated at 52, and are connected by a wire 53 to the contacts 26 and 25, which are also connected together at 54.

As may be seen in Fig. 6, the contacts 5, 6 and 11, and the contacts 16, 17, 18, 25 and 26 are so positioned with respect to each other that the contact 17 engages the contact 5, the contact 18 engages the contact 6, and the contact 25 engages the contact 11. Therefore, with the brake pedal switch 46 closed, a closed circuit is present between the battery 47 and both stop lights 49 and 51. The wires of the closed circuit are represented with heavier lines than the remainder of the diagram of Fig. 6. It comprises the wire 45, contacts 5 and 6, connector 52, contacts 18 and 6, and wire 48 with respect to the light 49, and to the light 51, includes the wire 53, connector 54, contacts 25 and 11, and wire 50.

When the switch is moved to the position shown in Fig. 7, which illustrates the right turn signal circuit energized, and the brake pedal switch 46 in open position, the contact 18 is moved away from the contact 6, with the result that it is impossible to energize the light 49 by closing the switch 46. If, however, the switch 46 is closed, the light 51 will be energized through contacts 5 and 18, connector 52, wire 53, connector 54, contacts 26 and 11, and wire 50.

When the switch is moved to the position shown in Fig. 8, it is in the left turn position. Both contacts 25 and 26 are spaced from the contact 11, and therefore the light 51 cannot be energized by closing the foot pedal switch 46. The light 49 may be illuminated by closing the switch 46, through the contacts 5 and 16, the contacts 17 and 6, and the wire 48.

The system includes what is commonly known as a "blinker" 55, which comprises a device for intermittently interrupting the current. The blinker 55 is connected by a wire 56 to the battery 47 and by wires 57 and 58 to the contacts 7 and 10 respectively. The contacts 19, 20 and 21 are connected together by a connector 62 and are so spaced with respect to each other and with respect to the contacts 6, 7 and 8 that when the switch is in the neutral position shown in Figs. 1 and 6 there is no connection with the contact 7. When the switch is moved to the right turn position, shown in Figs. 2 and 7, the contact 20 engages the contact 7, the contact 19 engages the contact 6 and the contact 21 engages the contact 8. The contact 8 is connected by a wire 59 to a right-front indicator lamp 60 and to a tell-tale lamp 61 mounted on a dash, so that the lights 60 and 61 become illuminated through the blinker 55. Current flows from the contact 7 through the contact 20, connector 62, contacts 19 and 6, and wire 48 to the light 49, causing the latter to blink intermittently. The current carrying lines have been shown heavier than the others in order to make them more easily distinguished.

When the switch is moved to the position shown Fig. 8, there is no engagement between any of the contacts 19, 20 and 21 with the contacts 6 and 8.

When the switch is moved to the position shown in Fig. 8 the contacts 22, 23, and 24 engage the contacts 9, 10 and 11. The contacts 22, 23 and 24 are connected together by a connector 63, and the contact 9 is connected by a wire 64 to a front left hand indicator light 65 and to a tell-tale dash light 66. Therefore, current from the blinker flows from the contact 10 through the connector 63 and contacts 22 and 24 to the contacts 9 and 11 respectively. From the contact 9 the current flows through the wire 64 to the lights 65 and 66, and from the contact 11 through the wire 50 to the left hand stop light 51.

Although a specific embodiment of the invention has been illustrated and described, it will be understood that various changes may be made within the scope of the appended claims without departing from the spirit of the invention, and such changes are contemplated.

What is claimed is:

1. In a turn signal switch, a disc adapted to be connected to a vehicle steering member for reverse rotation about an axis incident to different steering movements of the vehicle, a switch member movable in reverse directions from a neutral to circuit selecting positions, manual means for moving said switch member, a plate pivotally mounted for swinging movement about an axis spaced from the axis of said disc, and means connecting said switch member to said plate for causing swinging movement of the plate from a neutral to selective positions, said plate having dual friction means normally spaced from said disc, said friction means being disposed on radii of the plate spaced substantially equally on opposite sides of an imaginary line extending through the axes of the disc and plate and being so spaced from said axes that they alternately engage said disc as said plate is swung from its neutral position to alternate selective positions whereby they tend to transmit movement from the disc to the plate and switch member.

2. In a turn signal switch, a disc adapted to be connected to a vehicle steering member for reverse rotation about an axis incident to different steering movements of the vehicle, a switch member movable in reverse directions from a neutral to circuit selecting positions, manual means for moving said switch member, a plate pivotally mounted for swinging movement about an axis spaced from the axis of said disc, and means connecting said switch member to said plate for causing swinging movement of the plate from a neutral to selective positions, said plate having dual friction means normally spaced from said disc, said friction means being disposed on radii of the plate spaced substantially equally on opposite sides of an imaginary line extending through the axes of the disc and plate and being so spaced from said axes that they alternately engage said disc as said plate is swung from its neutral position to alternate selective positions whereby they tend to transmit movement from the disc to the plate and switch member, and means operative when said plate is in either selected position for preventing movement thereof in a direction other than that which restores said plate and switch member to their normal positions.

3. In combination with a vehicle steering member rotatable in reverse directions incident to different steering movements of the vehicle, a disc mounted for rotation about the axis of said steering member, a lost-motion connection between said disc and said steering member for causing delayed rotation of said disc incident to steering movements of the vehicle, a switch member movable in reverse directions from a normal to selective positions, manual means for moving said switch member, a plate pivotally mounted for swinging movement about an axis spaced from the axis of said disc, and means connecting said switch member to said plate for causing swinging movement of the plate from a neutral to selective positions, said plate having dual friction means normally spaced from said disc, said friction means being disposed on radii of the plate spaced substantially equally on opposite sides of an imaginary line extending through the axes of the disc and plate and being so spaced from said axes that they alternately engage said disc as said plate is swung from its neutral position to alternate selective positions whereby they tend to transmit movement from the disc to the plate and switch member.

4. In combination with a vehicle steering member rotatable in reverse directions incident to different steering movements of the vehicle, a disc mounted for rotation about the axis of said steering member, a lost-motion connection between said disc and said steering member for causing delayed rotation of said disc incident to steering movements of the vehicle, a switch member movable in reverse directions from a normal to selective positions, manual means for moving said switch member, a plate pivotally mounted for swinging movement about an axis spaced from the axis of said disc, means connecting said switch member to said plate for causing swinging movement of the plate from a neutral to selective positions, said plate having dual friction means normally spaced from said disc, said friction means being disposed on radii of the plate spaced substantially equally on opposite sides of an imaginary line extending through the axes of the disc and plate and being so spaced from said axes that they alternately engage said disc as said plate is swung from its neutral position to alternate selective positions whereby they tend to transmit movement from the disc to the plate and switch member, and means operative when said plate is in either selected position for preventing movement thereof in a direction other than that which restores said plate and switch member to their normal positions.

5. In a turn signal switch, a disc adapted to be connected to a vehicle steering member for reverse rotation about an axis incident to different steering movements of the vehicle, a switch member movable in reverse directions from a neutral to circuit selecting positions, manual means for moving said switch member, a pair of pivotally mounted plates connected together for unitary swinging movement, means connecting said plates to said switch member in such manner that the plates pivot when said switch member is moved, a spring yieldingly pressing said plates together, said plates having two sets of coacting projections held in contact with each other by said spring and spacing said plates apart a distance slightly greater than the thickness of said disc, said plates extending over opposite sides of said disc, said projections being disposed on radii of said plates spaced substantially equally on opposite sides of an imaginary line passing through the axes of the disc and plates when said plates are in a neutral position, and said projections being spaced from the axes of the disc and plates a distance such that alternate sets of projections frictionally engage opposite sides of said disc when said plates are moved in alternate directions from their neutral position.

6. In a turn signal switch, a disc adapted to be connected to a vehicle steering member for reverse rotation about an axis incident to different steering movements of the vehicle, a switch member movable in reverse directions from a neutral to circuit selecting positions, manual means for moving said switch member, a pair of pivotally mounted plates connected together for unitary swinging movement, means connecting said plates to said switch member in such manner that the plates pivot when said switch member is moved, a spring yieldingly pressing said plates together, said plates having two sets of coacting projections held in contact with each other by said spring and spacing said plates apart a distance slightly greater than the thickness of said disc, said plates extending over opposite sides of said disc, said projections being disposed on radii of said plates spaced substantially equally on opposite sides of an imaginary line passing through the axes of the disc and plates when said plates are in a neutral position, said projections being spaced from the axes of the disc and plates a distance such that alternate sets of projections frictionally engage opposite sides of said disc when said plates are moved in alternate directions from their neutral position, and means operative when said plates are in either alternative positions for preventing movement of the plates in a direction other than that which restores said plates and switch member to their neutral positions.

7. In combination with a vehicle steering member rotatable in reverse directions incident to different steering movements of the vehicle, a disc mounted for rotation about the axis of said steering member, a lost-motion connection between said disc and said steering member for causing delayed rotation of said disc incident to steering movements of the vehicle, a switch member movable in reverse directions from a normal to selective positions, manual means for moving said switch member, a plate pivotally mounted for swinging movement about an axis spaced from the axis of said disc, means connecting said switch member to said plate for causing swinging movement of the plate from a neutral to selective positions, said plate having dual friction means normally spaced from said disc, said friction means being disposed on radii of the plate spaced substantially equally on opposite sides of an imaginary line extending through the axes of the disc and plate and being so spaced from said axes that they alternately engage said disc as said plate is swung from its neutral position to alternate selective positions whereby they tend to transmit movement from the disc to the plate and switch member, a pair of pivotally mounted plates connected together for unitary swinging movement, means connecting said plates to said switch member in such manner that the plates pivot when said switch member is moved, a spring yieldingly pressing said plates together, said plates having two sets of coacting projections held in contact with each other by said spring and spacing said plates apart a distance slightly greater than the thickness of said disc, said plates extending over opposite sides of said disc, said projections being disposed on radii of said plates spaced substantially equally on opposite sides of an imaginary line passing through the axes of the disc and plates when said plates are in a neutral position, and said projections being spaced from the axes of the disc and plates a distance such that alternate sets of projections frictionally engage opposite sides of said disc when said plates are moved in alternate directions from their neutral position.

8. In combination with a vehicle steering member rotatable in reverse directions incident to different steering movements of the vehicle, a disc mounted for rotation about the axis of said steering member, a lost-motion connection between said disc and said steering member for causing delayed rotation of said disc incident to steering movements of the vehicle, a switch member movable in reverse directions from a normal to selective positions, manual means for moving said switch member, a plate pivotally mounted for swinging movement about an axis spaced from the axis of said disc, means connecting said switch member to said plate for causing swinging movement of the plate from a neutral to selective positions, said plate having dual friction means normally spaced from said disc, said friction means being disposed on radii of the plate spaced substantially equally on opposite sides of an imaginary line extending through the axes of the disc and plate and being so spaced from said axes that they alternately engage said disc as said plate is swung from its neutral position to alternate selective positions whereby they tend to transmit movement from the disc to the plate and switch member, a pair of pivotally mounted plates connected together for unitary swinging movement, means connecting said plates to said switch member in such manner that the plates pivot when said switch member is moved, a spring yieldingly pressing said plates together, said plates having two sets of coacting projections held in contact with each other by said spring and spacing said plates apart a distance slightly greater than the thickness of said disc, said plates extending over opposite sides of said disc, said projections being disposed on radii of said plates spaced substantially equally on opposite sides of an imaginary line passing through the axes of the disc and plates when said plates are in a neutral position, said projections being spaced from the axes of the disc and plates a distance such that alternate sets of projections frictionally engage opposite sides of said disc when said plates are moved in alternate directions from their neutral position, and means operative when said plates are in either alternative positions for preventing movement of the plates in a direction other than that which restores said plates and switch member to their neutral positions.

AUGUST E. WILSHUSEN.